United States Patent
Ren et al.

(10) Patent No.: US 11,612,165 B2
(45) Date of Patent: Mar. 28, 2023

(54) PESTICIDE COMPOSITION FOR CONTROLLING SPODOPTERA FRUGIPERDA

(71) Applicant: Institute of Protection and Agro-Products Safety, Anhui Academy of Agricultural Science, Hefei (CN)

(72) Inventors: Xuexiang Ren, Hefei (CN); Zhenghe Ye, Hefei (CN); Xianyan Su, Hefei (CN); Lina Xu, Hefei (CN); Haoliang Chen, Hefei (CN); Yu Chi, Hefei (CN)

(73) Assignee: INSTITUTE OF PROTECTION AND AGRO-PRODUCTS SAFETY, ANHUI ACADEMY OF AGRICULTURAL SCIENCE, Hefei (CN)

( * ) Notice: Subject to any disclaimer, the term of this patent is extended or adjusted under 35 U.S.C. 154(b) by 0 days.

(21) Appl. No.: 17/037,582

(22) Filed: Sep. 29, 2020

(65) Prior Publication Data

US 2021/0368796 A1 Dec. 2, 2021

(30) Foreign Application Priority Data

May 29, 2020 (CN) .......................... 202010476039.6

(51) Int. Cl.
| | | |
|---|---|---|
| *A01N 45/00* | (2006.01) | |
| *A01N 25/14* | (2006.01) | |
| *A01N 25/26* | (2006.01) | |
| *A01N 43/40* | (2006.01) | |
| *A01N 43/56* | (2006.01) | |

(52) U.S. Cl.
CPC ............ *A01N 45/00* (2013.01); *A01N 25/14* (2013.01); *A01N 25/26* (2013.01); *A01N 43/40* (2013.01); *A01N 43/56* (2013.01)

(58) Field of Classification Search
CPC ........ A01N 45/00; A01N 25/14; A01N 25/26; A01N 43/40; A01N 43/56; A01N 43/16
See application file for complete search history.

(56) References Cited

FOREIGN PATENT DOCUMENTS

CN 104604926 * 5/2015 ............. A01N 51/00

OTHER PUBLICATIONS

Machine Translation of CN 104604926, Jianwen et al, IP.com, pp. 1-7. (Year: 2015).*

* cited by examiner

Primary Examiner — Trevor Love
(74) Attorney, Agent, or Firm — Daniel M. Cohn; Howard M. Cohn

(57) ABSTRACT

Disclosed is a pesticide composition for controlling *Spodoptera frugiperda*. The pesticide includes an auxiliary material, an active ingredient A and an active ingredient B. The active ingredient A is tea saponin, the active ingredient B is chlorantraniliprole or tolfenpyrad, and the mass ratio of the active ingredient A to the active ingredient B is 1-20: 20-1. In the present invention, by mixing tea saponin with chlorantraniliprole or tolfenpyrad, a pesticide with certain ratio is prepared to control *Spodoptera frugiperda*, has the advantages of good effect and low dosage, and can delay the resistance of *Spodoptera frugiperda* to pesticides.

6 Claims, No Drawings

PESTICIDE COMPOSITION FOR CONTROLLING SPODOPTERA FRUGIPERDA

TECHNICAL FIELD

The present invention belongs to the technical field of chemical control for pests, and particularly relates to a pesticide composition for controlling *Spodoptera frugiperda*.

BACKGROUND

*Spodoptera frugiperda*, also known as autumn armyworm, meadow armyworm, pseudo armyworm, belongs to Lepidoptera, Noctuidae. The larvae thereof can gnaw a lot of corn, rice, and other various crops. *Spodoptera frugiperda* is native to tropical regions of Africa, and has a strong ability to migrate. The larvae gnaw leaves, causing leaf fall, and then the damage is transferred to other parts. Sometimes the larvae damage the roots by cutting off the seedlings and the stems of the plants, causing sparse breaks up and then causing drop in crop yield by more than 80% in severe case. *Spodoptera frugiperda* has invaded most provinces in China, if *Spodoptera frugiperda* is not reasonably and effectively controlled, the damaged area of crops in China may be further expanded.

Chlorantraniliprole, commonly known as CORAGEN, has been used for controlling Lepidopteran pests such as *Chilo suppressalis, Cnaphalocrocis medinalis* Guenee, etc. However, due to the increase in dosage, the resistance of *Cnaphalocrocis medinalis* Guenee and *Chilo suppressalis* to chlorantraniliprole is becoming more and more serious. At present, the effect of controlling *Spodoptera frugiperda* is good, but there is still a need to guard against the emergence of resistance.

Tolfenpyrad is a novel pyrazole heterocyclic chemical as both insecticide and miticide developed by the Mitsubishi Chemical Holdings, which has the main mechanism of prevention of the oxidative phosphorylation of insects and also has the effects of ovicidal reaction and feeding inhibition.

Therefore, it is a problem urgently to be solved by those skilled in the art about how to provide a pesticide composition which is low in dosage and can delay the emergence of resistance.

SUMMARY

In view of this, the present invention provides a pesticide composition for controlling *Spodoptera frugiperda*. In the present invention, by mixing tea saponin with chlorantraniliprole or tolfenpyrad, a pesticide with certain ratio is prepared, to control *Spodoptera frugiperda*, has the advantages of good effect and low dosage, and can well delay the resistance of *Spodoptera frugiperda* to pesticides.

To achieve the above purpose, the present invention adopts the following technical solution:

A pesticide composition for controlling *Spodoptera frugiperda*, comprising an auxiliary material, and further comprising an active ingredient A and an active ingredient B, wherein the active ingredient A is tea saponin, and the active ingredient B is chlorantraniliprole or tolfenpyrad.

Tea saponin is a carbohydrate compound extracted from the seeds of *Camellia* plates, belongs to the saponin class, is also a natural non-ionic surfactant, and can also be directly used as a biological pesticide. As a pesticide wetting agent, tea saponin can improve the wetting performance and suspension rate ($\geq 75\%$) of wettable powders. As a natural non-ionic surfactant, when being added into a pesticide, tea saponin can significantly improve the physical and chemical properties of pesticide liquid, increase the effective accumulation of the pesticide on the target, and contribute to the full display of the pesticide efficacy. However, in the pesticide composition of the present invention, tea saponin not only acts as a wetting agent, but also has a control effect on *Spodoptera frugiperda*, which is not reported in the prior art. In the present invention, by mixing tea saponin with chlorantraniliprole or tolfenpyrad, a pesticide with certain ratio is prepared, so that the control effect is significantly increased, and the pesticide costs are significantly reduced. Meanwhile, the pesticide composition of the present invention can control other Lepidopteran pests (such as *Chilo suppressalis*, beet armyworm, etc.) as well, and has a good effect on reducing the resistance of *Spodoptera frugiperda* to pesticides.

Preferably, the weight sum of the active ingredient A and the active ingredient B is 1-90% of the total weight of the pesticide composition, the auxiliary material as the rest.

The percentage of the active ingredients of the present invention can effectively cover the active ingredients A and B, to provide guarantee for pesticide preparation.

Preferably, the mass ratio of the active ingredient A to the active ingredient B is 1-20:20-1.

Preferably, the mass ratio of the active ingredient A to the active ingredient B is 1-10:10-1.

Preferably, the mass ratio of the active ingredient A to the active ingredient B is 1-10:5-1.

For the present invention, it is proved by a large number of experiments that the active ingredients A and B can achieve the addition and synergism effects of the pesticide within the above-mentioned ratio range.

Preferably, the pesticide composition is an emulsifiable concentrate and includes the following raw materials in weight percentage: 1-35% of the active ingredient A, 1-20% of the active ingredient B, 3-30% of solvent, and 5-15% of emulsifier.

Preferably, the emulsifiable concentrate is specifically processed in the following steps: weighing raw materials according to the above formula, dissolving the tea saponin, and the chlorantraniliprole or the tolfenpyrad with the solvent, adding the emulsifier, uniformly stirring in a stirring vessel, and thus obtaining the emulsifiable concentrate.

Preferably, the pesticide composition is a suspension emulsion and includes the following raw materials in weight percentage: 1-40% of the active ingredient A, 1-40% of the active ingredient B, 1-4% of wetting agent, 0.5-4% of antifreezing agent, 0.1-3% of thickening agent, 3-6% of dispersant, 0.1-1% of defoaming agent, and 2-93.3% of water.

Preferably, the suspension emulsion is processed in the following steps: weighing raw materials according to the above formula, mixing the additives, shearing at high speed (revolving speed of 3000-5000 rpm), uniformly mixing, adding the chlorantraniliprole or the tolfenpyrad and the tea saponin, milling for 1-4 h in a sand mill to make the particle size of each particle below 5 μm, and thus obtaining the suspension emulsion of the present invention.

The suspension emulsion used in the present invention can effectively reduce the use amount of organic solvents, thereby reducing costs, reducing environmental pollution, and increasing safety.

Preferably, the pesticide composition is a water dispersible granule and includes the following raw materials in weight percentage: 1-20% of the active ingredient A, 1-45% of the active ingredient B, 2-8% of wetting agent, 2-8% of dispersant, 2-4% of disintegrant, and 15-92% of filler.

Preferably, the water dispersible granule is specifically processed in the following steps: weighing raw materials according to the above formula, uniformly mixing the chlorantraniliprole or the tolfenpyrad and the tea saponin with the dispersant, the wetting agent, the disintegrant and the filler, milling to below 10 μm by a micron jet mill, kneading to the size of wheat kernels, adding into a granulation fluidized-bed dryer for granulating, drying and sieving, and thus obtaining the water dispersible granule.

The water dispersible granule prepared by adopting the proportion and preparation method of the present invention can be used directly in a mode of spreading on interior leaves (spreading the pesticide on the interior leaves of corn plants) or can be sprayed, each mode having a good control effect on *Spodoptera frugiperda*.

Preferably, the pesticide composition is a wettable powder and includes the following raw materials in weight percentage: 1-20% of the active ingredient A, 1-60% of the active ingredient B, 3-10% of dispersant, 1-8% of wetting agent, and 2-94% of filler.

Preferably, the wettable powder is specifically processed in the following steps: weighing raw materials according to the above formula, mixing the chlorantraniliprole or the tolfenpyrad and the tea saponin with the dispersant, the wetting agent and the filler, uniformly stirring in a stirring vessel, milling by a jet mill (the particle size is 5-200 μm), uniformly mixing, and thus obtaining the wettable powder.

The wettable powder prepared by adopting the proportion and preparation method of the present invention has the advantages of low processing costs, convenient use, and convenient packaging and transportation.

Preferably, the pesticide composition is an emulsion in water and includes the following raw materials in weight percentage: 1-30% of the active ingredient A, 1-35% of the active ingredient B, 2-6% of emulsifier, 1-3% of antifreezing agent, 0.1-5% of thickening agent, 0.1-1% of defoaming agent, 3-5% of solvent, and 15-91.8% of water.

Preferably, the emulsion in water is specifically processed in the following steps: weighing raw materials according to the above formula, mixing the chlorantraniliprole or the tolfenpyrad, the tea saponin, the solvent and the emulsifier, and dissolving into a uniform oil phase; mixing the water, the antifreezing agent and the defoaming agent into a uniform aqueous phase; and stirring at high speed (revolving speed of 5000-8000 rpm) and adding the aqueous phase into the oil phase, shearing at high speed for 5-10 min, forming an oil-in-water type emulsion in water, and thus obtaining the emulsion in water.

The emulsion in water prepared by adopting the proportion and preparation method of the present invention can effectively reduce the use amount of organic solvents and emulsifiers, and is environmentally friendly and has low toxicity.

Preferably, the pesticide composition is a capsule suspension and includes the following raw materials in weight percentage: 1-20% of the active ingredient A, 1-30% of the active ingredient B, 0.5-4% of capsule shell material, 2-4% of emulsifier, 1-2% of thickening agent, 1-3% of solvent, 1-4% of dispersant, 0-2% of pH regulator, and 31-92.5% of water.

Preferably, the capsule suspension is specifically processed in the following steps: weighing raw materials according to the above formula, dissolving the chlorantraniliprole or the tolfenpyrad and the tea saponin in the solvent, adding the capsule shell material, uniformly stirring, and obtaining an oil phase; adding the emulsifier in the water, uniformly stirring, and obtaining an aqueous phase; adding the aqueous phase into the oil phase, homogenizing at high speed (revolving speed of 2000-5000 rpm), and forming an oil in water emulsion; at 450-600 rpm, adding polyamine to participate in interfacial polymerization, increasing the reaction temperature to 25-70° C., keeping for 2-24 h, and curing into a capsule; and adding the dispersant and the thickening agent, uniformly stirring, and thus obtaining the capsule suspension.

The application of the capsule suspension can realize the slow release of the pesticide and prolong the service life of the pesticide.

Preferably, the emulsifier is selected from one or more of alkylbenzene napsylate, alkylphenol ethoxylates phosphate, diphenylphenol polyoxyethylene polyoxypropylene ether, styrenated phenol polyoxyethylene ether, alkylphenol ethoxylates formaldehyde condensate, diphenylphenol polyoxyethylene polyoxymethylene condensate, castor oil ethylene oxide adduct, NNO, NP, pesticide emulsifier 500, pesticide emulsifier 600, Tween-80 and polyvinyl alcohol.

The emulsifier prepared in the present invention can greatly enhance the emulsification effect of the pesticide in water, and realize the uniform diffusion of the pesticide.

Preferably, the dispersant is selected from one or more of ligninsulfonate, fatty acid amide N-Methyltaurine sodium salt, alkylphenol ethoxylates sulfate, polyoxyethylene polyoxypropylene block copolymer, alkylphenol ethoxylates and fatty alcohol polyoxyethylene ether.

The dispersant prepared in the present invention can greatly promote the dispersion effect of the pesticide, and make the pesticide combination disperse more uniformly.

Preferably, the wetting agent is selected from one or more of sodium dodecyl sulfate, calcium dodecylbenzene sulfonate, nekal BX, sodium alkylbenzene sulfonate, polyoxyethylene tristyrene phenyl phosphate, magnesium aluminum silicate and saponin powder.

The wetting agent prepared in the present invention can greatly enhance the emulsification and dispersion effect of the pesticide in medium, and realize the uniform dispersion of the pesticide.

Preferably, the disintegrant is selected from one or more of bentonite, urea, ammonium sulphate, aluminum chloride, citric acid, succinic acid and sodium bicarbonate.

The application of the disintegrant prepared in the present invention can greatly promote the absorption and disintegration of the pesticide composition.

Preferably, the filler is selected from one or more of kaolin, diatomite, bentonite, palygorskite, white carbon black, starch and light calcium carbonate.

Preferably, the thickening agent is selected from one or more of magnesium aluminum silicate, xanthan gum, methylol cellulose, arabic gum and polyvinyl pyrrolidone.

Preferably, the antifreezing agent is selected from one or more of ethylene glycol, propylene glycol, glycerin and polyethylene glycol.

Preferably, the defoaming agent is selected from one or more of silicone oil, silicone compound, C10-20 saturated fatty acid compound, C8-10 fatty alcohol compound and polyoxyethylene glyceryl ether.

Preferably, the capsule shell material is selected from one or more of methylphenyl isocyanate, polyaryl polymethylene isocyanate, diphenylmethane diisocyanate and urea-formaldehyde resin.

The capsule shell material used in the present invention can better realize the compatibility of the capsule shell and the pesticide, so that the capsule may be stronger and not easily broken.

Preferably, the solvent is selected from one or more of methylbenzene, dimethylbenzene, ethanol, N,N-Dimethylformamide, trichloromethane, cyclohexanone, cyclohexane and acetone.

Preferably, the pH regulator is mainly selected from one of hydrochloric acid, glacial acetic acid, citric acid, natrium hydroxide, aqueous ammonia, ethylenediamine, triethanolamine and triethylamine.

It can be known from the above technical solution that compared with the prior art, the present invention has the following beneficial effects:
(1) compared with the single pesticide, the pesticide composition of the present invention has the advantages that the control effect on Spodoptera frugiperda is significantly increased, and pesticide costs are significantly reduced; (2) the pesticide composition of the present invention can slow down the resistance of Spodoptera frugiperda to pesticides and prolong the service life of pesticides; (3) the pesticide composition of the present invention can have both quick acting effect and long acting effect on control of Spodoptera frugiperda; (4) the pesticide composition of the present invention can substantially reduce field dosage and then effectively reduce environmental pollution and pesticide residue; and (5) the pesticide composition of the present invention can reduce toxicity to other non-target organisms.

DETAILED DESCRIPTION

The technical solution in embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

A pesticide composition for controlling Spodoptera frugiperda: 27% chlorantraniliprole•tea saponin emulsifiable concentrate:
including the following raw materials in weight percentage: 10% of tea saponin, 17% of chlorantraniliprole, 15.3% of ethanol, 12% of dimethylformamide, 5% of pesticide emulsifier 601, 2% of castor oil polyethylene glycol condensate, and solvent naphtha filled to 100%. The raw materials are uniformly stirred, and thus the 27% chlorantraniliprole•tea saponin emulsifiable concentrate is prepared.

Embodiment 2

A pesticide composition for controlling Spodoptera frugiperda: 50% chlorantraniliprole•tea saponin wettable powder:
including the following raw materials in weight percentage: 20% of tea saponin, 30% of chlorantraniliprole, 11% of fatty amide N-Methyltaurine sodium salt, 7% of saponin powder, 7% of palygorskite, and light calcium carbonate filled to 100%. The raw materials are mixed and then milled by a jet mill, and thus the 50% chlorantraniliprole•tea saponin wettable powder is prepared.

Embodiment 3

A pesticide composition for controlling Spodoptera frugiperda: 12.5% chlorantraniliprole•tea saponin water dispersible granule:
including the following raw materials in weight percentage: 6.25% of tea saponin, 6.25% of chlorantraniliprole, 3.6% of fatty amide N-Methyltaurine sodium salt, 4.2% of sodium methyl fatty amide benzene sulfonate, 2% of polyoxyethylene tristyrene phenyl phosphate, 2% of urea, and palygorskite filled to 100%. The raw materials are mixed and granulated, and thus the 12.5% chlorantraniliprole•tea saponin water dispersible granule is prepared.

Embodiment 4

A pesticide composition for controlling Spodoptera frugiperda: 22% chlorantraniliprole•tea saponin suspension emulsion:
including the following raw materials in weight percentage: 11% of tea saponin, 11% of chlorantraniliprole, 3% of alkylphenol ethoxylates, 2.1% of sodium lignin sulfonate, 1.5% of magnesium aluminum silicate, 0.15% of xanthan gum, 4% of glycol, 2% of polyoxyethylene glyceryl ether, and water filled to 100%. The raw materials are uniformly mixed, are placed in a sand mill and are milled to a particle size of 5 μm, and thus the 22% chlorantraniliprole•tea saponin suspension emulsion is prepared.

Embodiment 5

A pesticide composition for controlling Spodoptera frugiperda: 30% chlorantraniliprole•tea saponin emulsion in water:
including the following raw materials in weight percentage: 5% of tea saponin, 25% of chlorantraniliprole, 4% of A-110, 5% of dimethylformamide, 6% of ethyl acetate, 3% of magnesium aluminum silicate, 0.5% of polyoxyethylene glyceryl ether, and water filled to 100%. The raw materials are dissolved with a solvent, the solution is slowly added to an aqueous phase at constant revolving speed, and thus the 30% chlorantraniliprole•tea saponin emulsion in water is prepared.

Embodiment 6

A pesticide composition for controlling Spodoptera frugiperda: 12% chlorantraniliprole•tea saponin capsule suspension:
including the following raw materials in weight percentage: 4% of tea saponin, 8% of chlorantraniliprole, 3% of dimethylformamide, 0.8% of methylene diphenyl diisocyanate, 2% of polyvinyl alcohol, 1% of fatty acid amide N-Methyltaurine sodium salt, 1.3% of hexamethylene diamine, 0.1% of xanthan gum, and water filled to 100%. The 12% chlorantraniliprole•tea saponin capsule suspension is prepared.

Embodiment 7

A pesticide composition for controlling Spodoptera frugiperda: 15% tolfenpyrad•tea saponin granule:
including the following raw materials in weight percentage: 5% of tolfenpyrad, 10% of tea saponin, 4% of fatty acid amide N-Methyltaurine sodium salt, 3% of sodium methyl fatty amide benzene sulfonate, 5% of polyoxyethylene tristyrene phenyl phosphate, 2% of urea, and palygorskite filled to 100%. The raw materials are mixed, extruded and granulated, and thus the 15% tolfenpyrad•tea saponin granule is prepared.

Embodiment 8

A pesticide composition for controlling *Spodoptera frugiperda*: 30% tolfenpyrad tea saponin suspension emulsion:
including the following raw materials in weight percentage: 15% of tolfenpyrad, 15% of tea saponin, 3% of NNO, 1.2% of sodium lignin sulfonate, 2% of 600, 2% of JFC-E, 0.2% of xanthan gum, and water filled to 100%. The raw materials are placed in a sand mill and milled to below 5 μm, and thus the 30% tolfenpyrad•tea saponin suspension emulsion is prepared according to the above-mentioned method.

Embodiment 9

A pesticide composition for controlling *Spodoptera frugiperda*: 15% tolfenpyrad•tea saponin emulsion in water:
including the following raw materials in weight percentage: 7.5% of tea saponin, 7.5% of tolfenpyrad, 4% of JFC-E, 7.2% of ethyl acetate, 3% of magnesium aluminum silicate, 2% of urea, 0.5% of polyoxyethylene glyceryl ether, and water filled to 100%. The raw materials are dissolved with a solvent, the solution is slowly added to an aqueous phase at constant revolving speed, and thus the 15% tolfenpyrad•tea saponin emulsion in water is prepared.

Examples of Application

1. Indoor Toxicity Test
Pesticide for test: TC of tea saponin; TC of chlorantraniliprole; TC of tolfenpyrad;
Pest for test: *Spodoptera frugiperda* (2-3-day-old);
Test method: immersion method: calculating the dosage of the TC according to the active ingredients, preparing the TC into a mother solution, adding clear water to dilute the mother solution to 5-7 gradient concentrations, taking clear water treatment as a control, and setting 3 repetitions for each treatment; selecting 20 larvae with basically the same growth state, putting the larvae into an experiment barrel containing pesticide liquid, covering a gauze (to prevent escape), placing in a 25° C. incubator, investing the death situations after 24 h, recording the number of the dead larvae, and processing data by DPS statistical software. The test results are shown in Table 1 and Table 2.

TABLE 1

Test results of toxicity of chlorantraniliprole and tea saponin which are mixed in different ratios to Spodoptera frugiperda (3-day-old)

| Pesticide | $LC_{50}$ (95% confidencelimit) (mg/L) | Co-toxicity coefficient (CTC) |
| --- | --- | --- |
| Chlorantraniliprole (A) | 0.283 (0.124-0.581) | — |
| Tea saponin (B) | 2.623 (1.176-4.633) | — |
| A:B 20:1 | 0.241 (0.144-0.564) | 122.64 |
| A:B 10:1 | 0.271 (0.101-0.644) | 113.64 |
| A:B 5:1 | 0.263 (0.078-0.745) | 126.40 |
| A:B 1:1 | 0.401 (0.136-0.966) | 127.40 |
| A:B 1:5 | 0.874 (0.374-1.214) | 126.20 |
| A:B 1:10 | 1.241 (0.742-3.214) | 120.66 |
| A:B 1:20 | 2.313 (1.124-5.330) | 81.37 |

TABLE 2

Test results of toxicity of tolfenpyrad and tea saponin which are mixed in different ratios to Spodoptera frugiperda (3-day-old)

| Pesticide | $LC_{50}$ (95% confidencelimit) (mg/L) | Co-toxicity coefficient (CTC) |
| --- | --- | --- |
| Tolfenpyrad (A) | 0.563 (0.241-0.833) | — |
| Tea saponin (B) | 2.623 (1.176-4.633) | — |
| A:B 20:1 | 0.571 (0.204-0.996) | 102.43 |
| A:B 10:1 | 0.582 (0.117-0.856) | 104.17 |
| A:B 5:1 | 0.532 (0.149-0.852) | 121.77 |
| A:B 1:1 | 0.674 (0.341-1.241) | 137.54 |
| A:B 1:5 | 1.203 (0.741-3.525) | 135.44 |
| A:B 1:10 | 1.622 (1.201-4.322) | 121.35 |
| A:B 1:20 | 1.944 (1.244-5.641) | 114.91 |

As shown in Table 1 and Table 2, tea saponin and chlorantraniliprole or tolfenpyrad show a good indoor toxicity effect on *Spodoptera frugiperda*. The co-toxicity coefficients of the compounds of chlorantraniliprole and tea saponin within the range of 20:1, 5-1:1:–10 to *Spodoptera frugiperda* are all greater than 120, showing a good synergistic effect, the optimal ratio being 1:1; and the co-toxicity coefficients of the compounds of tolfenpyrad and tea saponin within the range of 1-10:10-1 are all greater than 120, showing a good synergistic effect, the optimal ratio being 1:5.

2. Field effect: spraying the pesticide composition prepared in embodiment 1-9 in the experimental base of Haikou Maize Research Institute, and spraying when pests first appear. The test results are shown in Table 3.

TABLE 3

Field test results

| Pesticide | Spraying dosage/active ingredient/g | 5 d control effect/% | 10 d control effect/% |
| --- | --- | --- | --- |
| Embodiment 1 | 5.5 | 84.6 | 69.4 |
| Embodiment 2 | 5.5 | 87.5 | 61.4 |
| Embodiment 3 | 5.5 | 86.3 | 70.2 |
| Embodiment 4 | 5.5 | 89.2 | 68.2 |
| Embodiment 5 | 5.5 | 86.6 | 64.5 |
| Embodiment 6 | 5.5 | 87.5 | 66.0 |
| Embodiment 7 | 7.5 | 87.6 | 67.1 |
| Embodiment 8 | 7.5 | 90.2 | 63.3 |
| Embodiment 9 | 7.5 | 86.4 | 64.2 |
| 30% tolfenpyrad SC | 5.5 | 74.9 | 20.7 |
| 20% chlorantraniliprole SC | 5.5 | 80.2 | 42.2 |
| 65% tea saponin powder | 20 | 71.6 | 31.1 |

As shown in Table 3, the control effects of embodiments 1-9 on *Spodoptera frugiperda* are significantly higher than that of the single pesticide of the control pesticide, and embodiments 1-9 have good quick acting effect and good long lasting effect. Therefore, the mixture of chlorantraniliprole or tolfenpyrad and tea saponin has a good application prospect in controlling *Spodoptera frugiperda*.

In addition, the formula can also be prepared into ultra-low volume liquid for aircraft spray, as well as hot fogging concentrate, aerosols and other formulas that are easily conceived by those skilled in the art and used for controlling *Spodoptera frugiperda*.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A pesticide composition for controlling *Spodoptera frugiperda*, comprising an auxiliary material, and further comprising an active ingredient A and an active ingredient B; wherein the active ingredient A is tea saponin, and the active ingredient B is chlorantraniliprole;
   wherein the pesticide composition is a suspension emulsion and includes a dispersant; the dispersant is alkylphenol ethoxylates, and
   wherein a mass ratio of the active ingredient A to the active ingredient B is 1-20:20-1.

2. The pesticide composition for controlling *Spodoptera frugiperda* of claim 1, wherein a weight sum of the active ingredient A and the active ingredient B is 1-90% of a total weight of the pesticide composition, and the rest are the auxiliary material.

3. The pesticide composition for controlling *Spodoptera frugiperda* of claim 1, wherein the mass ratio of the active ingredient A to the active ingredient B is 1-10:5-1.

4. The pesticide composition for controlling *Spodoptera frugiperda* of claim 1, wherein the pesticide composition includes the following raw materials in weight percentage: 1-40% of the active ingredient A, 1-40% of the active ingredient B, 1-4% of wetting agent, 0.5-4% of antifreezing agent, 0.1-3% of thickening agent, 3-6% of the dispersant, 0.1-1% of defoaming agent, and 2-93.3% of water.

5. The pesticide composition for controlling *Spodoptera frugiperda* of claim 4, wherein the wetting agent is magnesium aluminum silicate.

6. The pesticide composition for controlling *Spodoptera frugiperda* of claim 4, wherein the defoaming agent is polyoxyethylene glyceryl ether.

* * * * *